(12) United States Patent
Lu et al.

(10) Patent No.: US 8,587,714 B2
(45) Date of Patent: Nov. 19, 2013

(54) METHOD FOR CAPTURING IMAGE

(75) Inventors: Chung-Pin Lu, New Taipei (TW); Yi-Yu Chen, Taipei (TW)

(73) Assignee: Altek Corporation, Hsinchu (TW)

( * ) Notice: Subject to any disclaimer, the term of this patent is extended or adjusted under 35 U.S.C. 154(b) by 5 days.

(21) Appl. No.: 13/205,626

(22) Filed: Aug. 9, 2011

(65) Prior Publication Data
US 2013/0010161 A1  Jan. 10, 2013

(30) Foreign Application Priority Data
Jul. 7, 2011 (TW) ............................. 100124040 A

(51) Int. Cl.
*H04N 5/222* (2006.01)
*H04N 5/235* (2006.01)
*G03B 7/00* (2006.01)
*G03B 15/03* (2006.01)

(52) U.S. Cl.
USPC ............ 348/371; 348/362; 348/370; 396/157

(58) Field of Classification Search
USPC ................. 348/370–372, 362, 364, 366, 234; 396/157, 164, 182
See application file for complete search history.

(56) References Cited

U.S. PATENT DOCUMENTS

| | | | |
|---|---|---|---|
| 5,860,029 A * | 1/1999 | Ichikawa et al. | 396/61 |
| 6,151,073 A * | 11/2000 | Steinberg et al. | 348/371 |
| 6,359,651 B1 * | 3/2002 | Yokonuma | 348/370 |
| 6,885,405 B1 * | 4/2005 | Steinberg et al. | 348/371 |
| 7,825,930 B2 * | 11/2010 | Kondo et al. | 345/473 |
| 2002/0034382 A1 * | 3/2002 | Tokunaga et al. | 396/157 |
| 2007/0263097 A1 * | 11/2007 | Zhao et al. | 348/221.1 |
| 2008/0111913 A1 * | 5/2008 | Okamoto | 348/363 |
| 2010/0158393 A1 * | 6/2010 | Lee et al. | 382/218 |
| 2010/0165178 A1 * | 7/2010 | Chou et al. | 348/371 |
| 2011/0044680 A1 * | 2/2011 | Fukui | 396/164 |

* cited by examiner

*Primary Examiner* — Roberto Velez
*Assistant Examiner* — Tuan Le
(74) *Attorney, Agent, or Firm* — Jianq Chyun IP Office

(57) ABSTRACT

A method for capturing an image, suitable for an image capturing apparatus with a flash lamp, is provided. In the invention, a pre-flash image is captured when a pre-flash is fired by the flash lamp. An intensity of a main flash is estimated. Whether the pre-flash image is overexposed is determined for calculating an overexposure number. A brightness comparison data is looked up according to the overexposure number and a brightness target value, so as to reduce a photosensitivity. A raw image is captured according to the reduced photosensitivity when the main flash is fired by the flash lamp.

8 Claims, 1 Drawing Sheet

METHOD FOR CAPTURING IMAGE

CROSS-REFERENCE TO RELATED APPLICATION

This application claims the priority benefit of Taiwan application serial no. 100124040, filed on Jul. 7, 2011. The entirety of the above-mentioned patent application is hereby incorporated by reference herein and made a part of specification.

BACKGROUND OF THE INVENTION

1. Field of the Invention

This invention is related generally to a method for capturing an image, and more particularly to a method for capturing image which avoids an overexposure phenomenon.

2. Description of Related Art

In photography, an exposure operation is typically performed through an auto exposure function to achieve the ideal brightness for an entire image. When under insufficient ambient lighting or when the exposure time is below a safe shutter speed, a flash lamp is employed for brightness compensation so that the captured image does not become unrecognizable due to inadequate brightness.

Generally speaking, an intensity of a main flash is estimated in accordance with a pre-flash image. In order to increase the accuracy of estimating the main flash intensity when shooting at close range, a conventional method follows the steps outlined hereafter. When a user switches to a proximity mode, a digital camera decreases a pre-flash intensity so that the estimation of the main flash is accurate. Alternatively, the digital camera determines whether it is shooting in proximity mode according to an auto focus data, so as to limit a light entrance amount by switching diaphragms, and thereby accurately estimate the main flash intensity. The digital camera may also estimate the main flash intensity at proximity through a second pre-flash.

However, if the user has not switched to the proximity mode when shooting images at close range, inaccurate estimations of the main flash usually occur and overexposed images are obtained. Moreover, when the auto focus estimation is inaccurate, the time points for switching the diaphragms may be incorrect. Thus, for an object at far range for example, inaccurate estimation of the main flash results and a dark corner problem is generated. On the other hand, although the overexposure problem at close range may be alleviated by firing the pre-flash twice at a same time, when the intensity of the second pre-flash is too low, the flash lamp becomes unstable, and when the intensity of the second pre-flash is too high, a voltage of the main flash becomes too low and the main flash fails to fire.

SUMMARY OF THE INVENTION

The invention provides a method for capturing an image, capable of preventing an overexposure phenomenon caused by image capture at close range.

The invention provides a method for capturing an image, suitable for an image capturing apparatus with a flash lamp. In the method, a pre-flash image is captured when a pre-flash is fired by the flash lamp. An intensity of a main flash is estimated. Moreover, whether the pre-flash image is overexposed is determined for calculating an overexposure number. A brightness comparison data is looked up according to the overexposure number and a brightness target value, so as to reduce a photosensitivity. A raw image is captured according to the reduced photosensitivity when the main flash is fired by the flash lamp.

According to an embodiment of the invention, in the step of determining whether the pre-flash image is overexposed for calculating the overexposure number, the pre-flash image may be first divided into a plurality of regions, and then whether each of the regions is overexposed is determined in sequence, so as to accumulate the overexposure number when one of the regions is determined as overexposed. Regarding the step of determining whether each of the regions is overexposed, an average brightness value of each of the regions and a predetermined brightness value may be compared in sequence. When the average brightness value of one of the regions is greater than the predetermined brightness value, the region is determined as overexposed.

According to an embodiment of the invention, in the step of determining whether the pre-flash image is overexposed for calculating the overexposure number, whether each of the pixels in the pre-flash image is overexposed is determined in sequence, and the overexposure number is accumulated when one of the pixels is overexposed. Regarding the step of determining whether each of the pixels is overexposed, a brightness value of each of the pixels and a predetermined brightness value may be compared in sequence. When the brightness value of a pixel is greater than the predetermined brightness value, this pixel is determined as overexposed.

According to an embodiment of the invention, in the step of looking up the brightness comparison data according to the overexposure number and the brightness target value, a brightness reduction ratio corresponding to the overexposure number and the brightness target value is obtained from the brightness comparison data, so as to reduce the photosensitivity according to the brightness reduction ratio.

According to an embodiment of the invention, the step of estimating the intensity of the main flash may further include estimating the intensity of the main flash according to the overexposure number and the brightness target value.

According to an embodiment of the invention, after the step of capturing the raw image according to the reduced photosensitivity, the method further includes calculating an average brightness value of the raw image. Thereafter, a factor of a difference between the average brightness value and the brightness target value is calculated, and a brightness of the raw image is adjusted according to the factor.

According to an embodiment of the invention, the method for capturing the image further includes first establishing the brightness comparison data. For example, with a test image capturing a fully white object under a gray background, a brightness reduction ratio corresponding to the overexposure number of the test image under the corresponding brightness target value is estimated.

In summary, embodiments of the invention determine whether the pre-flash image is overexposed, and the amount of photosensitivity to reduce is determined according to the degree of overexposure. Accordingly, an overexposed phenomenon can be prevented when capturing images at close range under a single pre-flash condition.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Typically, a flash lamp is employed for brightness compensation when capturing photos under insufficient ambient lighting or when the exposure time is below a safe shutter speed. Due to the close proximity, when only a single pre-flash is used to capture a pre-flash image, inaccurate data is usually obtained. Consequently, the main flash cannot be accurate estimated, thereby generating an overexposed image. Accordingly, embodiments of the invention provide a method for capturing an image, capable of improving an overexposed image under a single pre-flash condition. In order to make the invention more comprehensible, embodiments are described below as the examples to prove that the invention can actually be realized.

Figure 1:
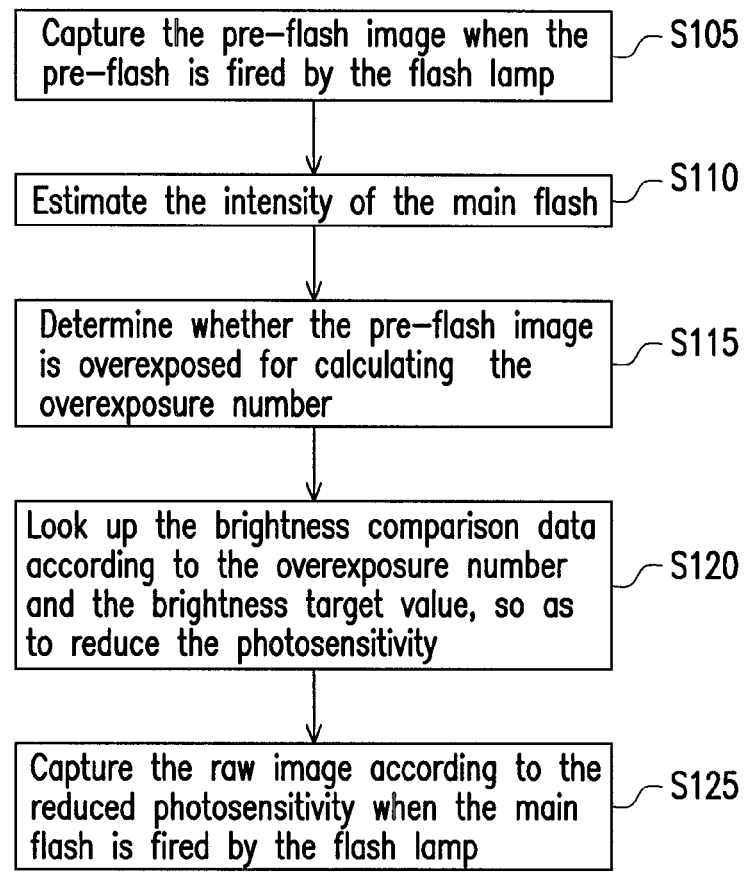
FIG. 1 is a flow chart of a method for capturing an image according to an embodiment of the invention.

FIG. 1 is a flow chart of a method for capturing an image according to an embodiment of the invention. In the present embodiment, the method for capturing image may be adapted for an image capturing apparatus having a processing unit (not drawn), in which the processing unit executes each of the steps for capturing an image. The image capturing apparatus may be a digital camera or a mobile phone with a photography function, for example, although the invention is not limited thereto.

Referring to FIG. 1, in a Step S105, a pre-flash image is captured when a pre-flash is fired by the flash lamp. In a Step S110, an intensity of a main flash is estimated. Typically speaking, a lower power pre-flash is fired before firing the main flash. A reflectivity of an object is determined by the pre-flash and an auto exposure parameter, and according to the object reflectivity, the intensity and an output time of the main flash are determined. For example, when a user presses a shutter, the auto exposure parameter is first obtained, and the pre-flash image is captured when the pre-flash is fired by the flash lamp. The intensity of the main flash is calculated according to the auto exposure parameter and the pre-flash image. Moreover, the intensity of the main flash may be further estimated in accordance with whether the pre-flash image is overexposed and a brightness target value to be achieved.

Figure 2:
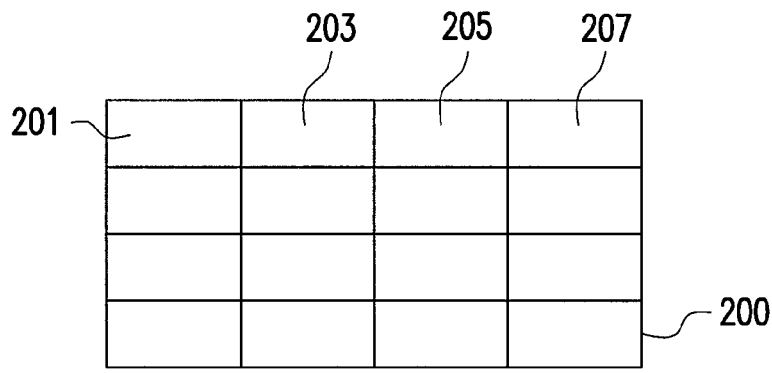
FIG. 2 is a schematic view of a division of a pre-flash image according to an embodiment of the invention.

In a Step S115, whether the pre-flash image is overexposed is determined for calculating an overexposure number. The pre-flash image may be divided into a plurality of regions. Thereafter, whether each of the regions is overexposed is determined in sequence. For example, FIG. 2 is a schematic view of a division of the pre-flash image according to an embodiment of the invention. Referring to FIG. 2, a pre-flash image 200 is divided into 16 regions as an example for illustrative purposes only, as the invention is not limited thereto. In other embodiments for example, the pre-flash image 200 may also be divided into 256 regions.

After dividing the pre-flash image 200 into the plurality of regions (e.g., including regions 201, 203, 205, and 207), whether an average brightness value of each of the regions is greater than a predetermined brightness value is compared in sequence. To facilitate description, regions 201, 203, 205, and 207 are used hereafter. When the average brightness value of the region 201 is greater than the predetermined brightness value, region 201 is determined as overexposed. Moreover, when the region 201 is determined as overexposed, the overexposure number is accumulated. Thereafter, whether the region 203 is overexposed is determined, whether the region 205 is overexposed is determined, and whether the region 207 is overexposed is determined, until all of the regions have been compared.

In other embodiments, whether all of the pixels in the pre-flash image are overexposed may be determined in sequence. For example, whether a brightness value of each of the pixels is greater than the predetermined brightness value may be compared in sequence. When the brightness value of one of the pixels is greater than the predetermined brightness value, this pixel is determined as overexposed. Accordingly, when one of the pixels is determined as overexposed, the overexposure number is accumulated until all of the pixels have been compared.

In a Step S120, a brightness comparison data is looked up according to the overexposure number and the brightness target value, so as to reduce a photosensitivity. For example, the brightness comparison data may be first established in the image capturing apparatus. With a test image capturing a fully white object under a gray background, a brightness reduction ratio corresponding to the overexposure number of the test image under the corresponding brightness target value is estimated. In a fully dark environment facing a wall surface of gray level 18, a white paper is placed on the wall surface. When a distance to the white paper decreases or a zoom ratio increases, the area which the white paper occupies in the test image becomes greater, meaning the overexposure number also increases.

Assume that the test image has been divided into 256 regions, the average brightness value when all of the 256 regions are overexposed is 220, and the brightness target value is 150. By lowering the average brightness value from 220 to 150, the photosensitivity is reduced from 100 to 64, and accordingly the brightness reduction ratio is known to be 36%. In other words, a reduction ratio of the photosensitivity can be estimated by calculating the amount of increase in the average brightness value of the test image when 1 is added each time to the overexposure number.

Accordingly, when officially capturing images after the brightness comparison data has been established in the image capturing apparatus, a brightness reduction ratio corresponding to the overexposure number and the brightness target value may be obtained from the brightness comparison data after the pre-flash image has been captured and the overexposure number has been calculated. Accordingly, the photosensitivity is reduced in accordance with the brightness reduction ratio. In the process of establishing the brightness comparison data, when the test image has been divided into a plurality of regions to calculate the overexposure number, then after capturing the pre-flash image, the pre-flash image is also divided into a plurality of regions to determine how many regions are overexposed. Moreover, in the process of establishing the brightness comparison data, when the pixels of the test image are used to count the overexposure number, then after capturing the pre-flash image, whether each of the pixels is overexposed is used to calculate the overexposure number.

In a Step S125, a raw image is captured according to the reduced photosensitivity when the main flash is fired by the flash lamp. Since the photosensitivity has already been reduced, the raw image obtained is not overexposed. After capturing the raw image, a brightness adjustment operation may be performed on the raw image. For example, an average brightness value of the raw image may be calculated. Thereafter, a factor of a difference between the average brightness value and the brightness target value is calculated, and the brightness of the raw image is calculated according to the factor.

In view of the foregoing, according to embodiments of the invention, the overexposure number is calculated from the pre-flash image, so as to derive a correlation between the overexposure number and the brightness target value, and to obtain a brightness reduction ratio to reduce the photosensitivity. Accordingly, an overexposed phenomenon can be prevented when shooting at close range under a single pre-flash condition.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for capturing an image, suitable for an image capturing apparatus with a flash lamp, the method comprising:
    capturing a pre-flash image when a pre-flash is fired by the flash lamp;
    estimating an intensity of a main flash;
    determining whether the pre-flash image is overexposed for calculating an overexposure number;
    looking up a brightness comparison data based on the overexposure number, wherein the brightness comparison data includes a brightness reduction ratio corresponding to the overexposure number under a brightness target value;
    obtaining the brightness reduction ratio corresponding to the overexposure number from the brightness comparison data, so as to reduce a photosensitivity according to the brightness reduction ratio; and
    capturing a raw image according to the reduced photosensitivity when the main flash is fired by the flash lamp so that an average brightness value of the raw image matches the brightness target value.

2. The method for capturing the image as claimed in claim 1, wherein the step of determining whether the pre-flash image is overexposed for calculating the overexposure number comprises:
    dividing the pre-flash image into a plurality of regions;
    determining in sequence whether each of the regions is overexposed; and
    accumulating the overexposure number when one of the regions is determined as overexposed.

3. The method for capturing the image as claimed in claim 2, wherein the step of determining in sequence whether each of the regions is overexposed comprises:
    comparing in sequence an average brightness value of each of the regions and a predetermined brightness value; and
    when the average brightness value of one of the regions is greater than the predetermined brightness value, determining the region as overexposed.

4. The method for capturing the image as claimed in claim 1, wherein the step of determining whether the pre-flash image is overexposed for calculating the overexposure number comprises:
    determining in sequence whether each of the pixels in the pre-flash image is overexposed; and
    accumulating the overexposure number when one of the pixels is overexposed.

5. The method for capturing the image as claimed in claim 4, wherein the step of determining in sequence whether each of the pixels in the pre-flash image is overexposed comprises:
    comparing in sequence a brightness value of each of the pixels and a predetermined brightness value; and
    when the brightness value of one of the pixels is greater than the predetermined brightness value, determining the pixel as overexposed.

6. The method for capturing the image as claimed in claim 1, wherein the step of estimating the intensity of the main flash comprises:
    estimating the intensity of the main flash according to the overexposure number and the brightness target value.

7. The method for capturing the image as claimed in claim 1, where after the step of capturing the raw image according to the reduced photosensitivity, the method further comprises:
    calculating an average brightness value of the raw image;
    calculating a factor of a difference between the average brightness value and the brightness target value; and
    adjusting a brightness of the raw image according to the factor.

8. The method for capturing the image as claimed in claim 1, further comprising:
    establishing the brightness comparison data, comprising:
        with a test image capturing a fully white object under a gray background, estimating a brightness reduction ratio corresponding to the overexposure number of the test image under the corresponding brightness target value.

* * * * *